United States Patent [19]
Wiard

[11] Patent Number: 5,566,794
[45] Date of Patent: Oct. 22, 1996

[54] SHOCK ABSORBER HAVING NONADJUSTABLE METERING

[75] Inventor: Harold D. Wiard, Livonia, Mich.

[73] Assignee: Ace Controls, Inc., Farmington, Mich.

[21] Appl. No.: 300,705

[22] Filed: Sep. 2, 1994

[51] Int. Cl.$^6$ .......................................... F16F 9/48
[52] U.S. Cl. ........................... 188/287; 188/315; 188/318
[58] Field of Search ................................... 188/286, 287, 188/315, 318, 322.13

[56] References Cited

U.S. PATENT DOCUMENTS

| | | | |
|---|---|---|---|
| 3,556,268 | 1/1971 | Fister et al. | 188/287 |
| 3,645,365 | 2/1972 | Domeck | 188/287 |
| 4,284,177 | 8/1991 | Domek | 188/280 |
| 5,388,711 | 2/1995 | Hodges | 188/287 |

*Primary Examiner*—Lee Young
*Attorney, Agent, or Firm*—Robert G. Mentag

[57] ABSTRACT

A nonadjustable shock absorber that can accommodate for variations in weight, and propelling force, and to provide a specific deceleration or reaction force. The shock absorber provides dual function metering that combines soft contact dampening with the self compensating ability to decelerate a wide range of weights. The shock absorber includes a low pressure zone, a hydraulic cylinder having a high pressure zone chamber, a piston in said cylinder for movement under a shock load through a predetermined stroke length, a fluid pathway metering control means, having four fluid metering pathways of which the first three fluid metering pathways are approximately linear spaced apart, for controlling high pressure fluid escaping from the high pressure zone chamber into the lower pressure zone, ahead of the piston as the piston moves from an initial position in response to a shock load through a total stroke to a final position, to create five control zones during the compression of the shock absorber. The five control zones are created by four transition points that occur when the piston successively closes off the area of each of the four fluid metering pathways of the fluid pathway metering control means, such as four fixed orifices having predetermined areas.

5 Claims, 10 Drawing Sheets

GRAPH 1 − ZONE ILLUSTRATION

VARIOUS METERING AREA GEOMETRY $D_{PA}$ = DIA OF PIN AT "A"
$A_A$ = AREA ANNULUS

TAPERED PIN

$D_P$ = DIA OF METERING PIN
$F_D$ = FLAT DEPTH

FLATTED PIN

$S_W$ = SLOT WIDTH
$S_D$ = SLOT DEPTH

SINGLE SLOT PIN

MULTI-SLOT PIN $D_B$ = DIA OF ORIFICE
$A_{D_B}$ = AREA OF ORIFICE $D_B$

FIXED ORIFICE

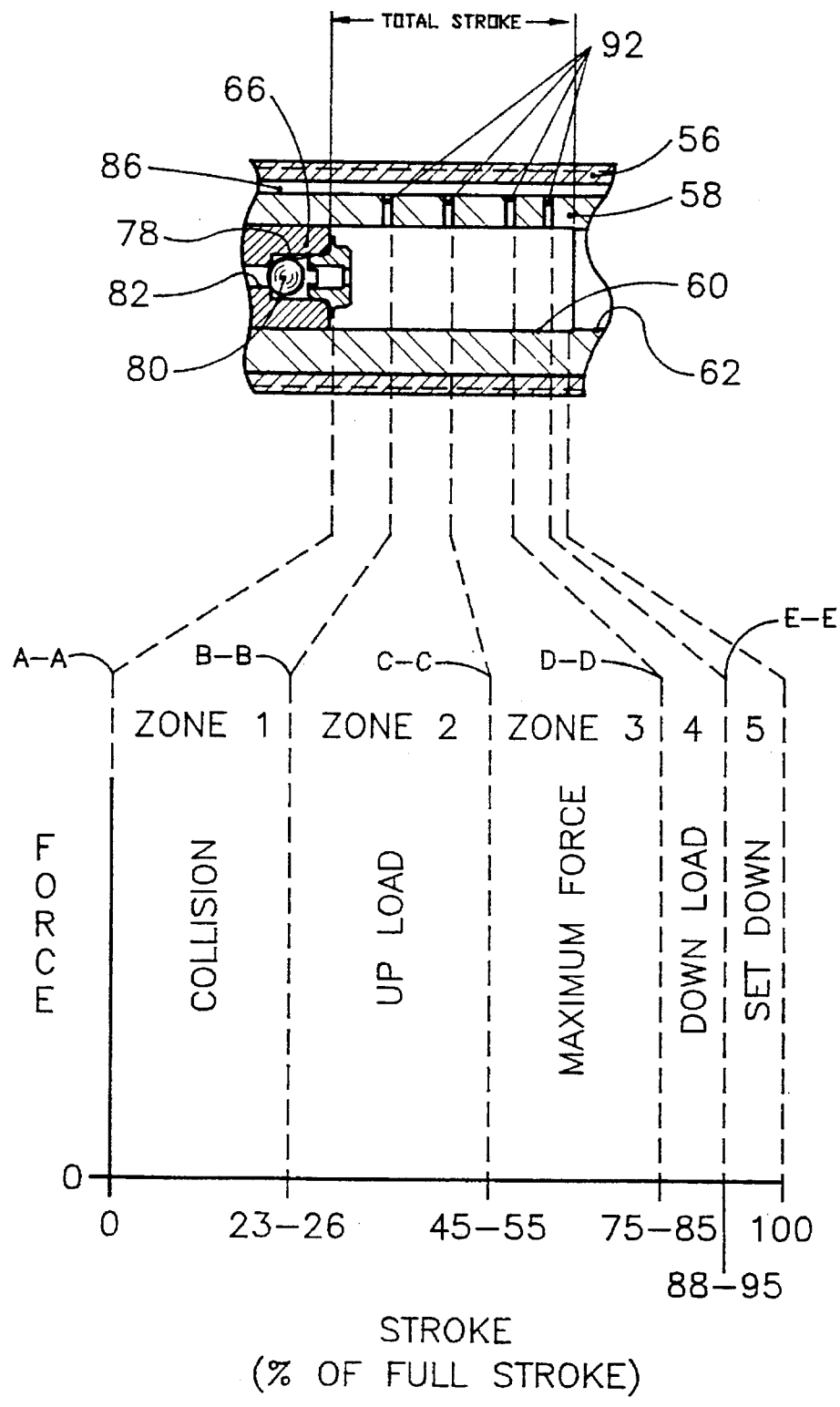

GRAPH 2

GRAPH 3

SOFT CONTACT FORCE PROFILES WITH A 3:1 Wt SPAN RATIO

GRAPH 4

SELF COMPENSATING FORCE PROFILES WITH A 6:1 Wt SPAN RATIO

GRAPH 5

FIG. 8

TABLE I

THREE EXAMPLE SHOCKS SHOWING GENERIC ORIFICE LOCATION / DESIGN ZONES

| ZONE NUMBER | UNIT #1 BORE=.30" STK=.6" | UNIT #2 BORE=.60" STK=1.0" | UNIT #3 BORE=.90" STK=2.0" | AVERAGE LENGTH OF ZONE | AVERAGE LENGTH FROM FRONT OF STROKE TO END OF TRANSITION POINT | DESIGN RANGE OF ZONE (MIN-MAX) | DESIGN RANGE TO TRANSITION POINT (MIN-MAX) |
|---|---|---|---|---|---|---|---|
| | LENGTH OF ZONE (% OF STK) | | | | (% OF FULL STROKE) | | |
| ZONE 1 | 24.6 | 26 | 26 | 25.5 | 25.5 | 23-26 | 23-26 |
| ZONE 2 | 24.6 | 26 | 26 | 25.5 | 51 | 23-26 | 45-55 |
| ZONE 3 | 27 | 25 | 26 | 26.0 | 76 | 24-28 | 75-85 |
| ZONE 4 | 14.2 | 13.3 | 16 | 14.5 | 90.5 | 13-18 | 88-95 |
| ZONE 5 | 9.6 | 8 | 6.2 | 8 | 98.5 | 2-10 | 100 |

FIG. 9

| UNIT NO. | MIN Wt (LBS) | MAX Wt (LBS) | MAX SPAN RATIO | SLOT DEPTH (IN) | | | | SLOT AREA (× $10^{-4}$ IN$^2$) ① | | | | METERING AREA RATIO |
|---|---|---|---|---|---|---|---|---|---|---|---|---|
| | | | | FRONT | | BACK | | FRONT | | BACK | | |
| | | | | $42_C\text{-}1$ | $42_C\text{-}2$ | $42_C\text{-}3$ | $42_C\text{-}4$ | A-1 | A-2 | A-3 | A-4 | |
| 1 | 5 | 15 | 3.0 | .113 | .113 | .038 | .038 | 70.1 | 70.1 | 23.8 | 23.8 | 2.94 |
| 2 | 15 | 45 | 3.0 | .063 | .063 | .021 | .021 | 39.4 | 39.4 | 13.2 | 13.2 | 2.99 |
| 3 | 45 | 135 | 3.0 | .036 | .036 | .012 | .012 | 22.1 | 22.1 | 7.54 | 7.54 | 2.93 |

TABLE II

WEIGHT SPAN RATIO VS METERING AREA RATIO
FOR MULTISLOT PIN MODEL

NOTES
① SLOT WIDTH IS .062 INCH WIDE.

KEY
MIN Wt: SMALLEST OBJECT WEIGHT METERING IS DESIGNED TO STOP.
MAX Wt: LARGEST OBJECT WEIGHT METERING IS DESIGNED TO STOP.
Wt SPAN RATIO: MAX Wt/MIN Wt.
METERING AREA RATIO: $(A_D + A_E)/(A_B + A_C)$
A-1 = AREA OF SLOT $42_C\text{-}1$ = (SLOT WIDTH × SLOT DEPTH)

FIG. 10

| UNIT NO. | MIN Wt (LBS) | MAX Wt (LBS) | Wt SPAN RATIO | ORIFICE DIA (IN) | | | | ORIFICE AREA (× $10^{-4}$ IN$^2$) | | | | METERING AREA RATIO |
|---|---|---|---|---|---|---|---|---|---|---|---|---|
| | | | | FRONT | | BACK | | FRONT | | BACK | | |
| | | | | $D_B$ | $D_C$ | $D_D$ | $D_E$ | $A_B$ | $A_C$ | $A_D$ | $A_E$ | |
| 1 | 5 | 15 | 3.0 | .0945 | .0945 | .0551 | .0551 | 70.1 | 70.1 | 23.8 | 23.8 | 2.94 |
| 2 | 15 | 45 | 3.0 | .0709 | .0709 | .0410 | .0410 | 39.4 | 39.4 | 13.2 | 13.2 | 2.99 |
| 3 | 45 | 135 | 3.0 | .0530 | .0530 | .0310 | .0310 | 22.1 | 22.1 | 7.54 | 7.54 | 2.93 |

TABLE III

WEIGHT SPAN RATIO VS METERING AREA RATIO FOR FIXED ORIFICE MODEL

NOTES
1) THE VALUES IN THIS TABLE REPRESENT NUMBERS FROM A SHOCK WITH A BORE DIA =.60 IN, STROKE=1.00 IN AND A PETRO BASED HYDRAULIC FLUID. SAME AS UNIT 2 IN TABLE I.

KEY
MIN Wt: SMALLEST OBJECT WEIGHT METERING IS DESIGNED TO STOP.
MAX Wt: LARGEST OBJECT WEIGHT METERING IS DESIGNED TO STOP.
Wt SPAN RATIO: MAX Wt/MIN Wt.
$A_B$: AREA OF ORIFICE DIA $D_B$.
METERING AREA RATIO: $(A_D + A_E)/(A_B + A_C)$

SHOCK ABSORBER HAVING NONADJUSTABLE METERING

BACKGROUND OF THE INVENTION

1. Field of the Invention

The field of art to which this invention pertains may be generally located in the class of devices relating to shock absorbers. Class 188, brakes, United States Patent Office Classification appears to be the applicable general area of art to which the subject matter similar to this invention has been classified in the past.

2. Description of the Prior Art

The purpose of industrial shock absorbers is to decelerate a load, that is to stop a moving mass, by creating a reaction force that resists the movement of the load and brings it to a full stop. There are two basic kinds of linear decelerating shock absorbers, namely adjustable and nonadjustable. Adjustable shock absorbers can work for a large range of loads or weights. For instance, a single adjustable shock absorber, when properly adjusted, can decelerate loads from 24 pounds to 2400 pounds, which would be a ratio of 100 to 1. However, once adjusted, it functions as a nonadjustable shock absorber which is limited to a weight range or ratio of 2 to 1, as for example 24 pounds to 48 pounds. The advantage of an adjustable shock absorber is that it can be adjusted to any one of the weights from 24 pounds to 2400 pounds. However, a disadvantage of an adjustable shock absorber is that once it is adjusted for one weight, it cannot accommodate much variation in weight, or propelling force. The advantage of a nonadjustable shock absorber is that it can be custom designed to accommodate a range of weights with ratios as high as 10 to 1. A nonadjustable shock absorber can also be designed to provide a custom or specific deceleration or reaction force, which produces a better sounding and better looking performance to the human observer. Even though a nonadjustable shock absorber can be designed to accommodate a range of weights, it cannot accommodate a weight range nearly as wide as an adjustable shock absorber.

SUMMARY OF THE INVENTION

The principle objective of the present invention is to provide an improved shock absorber having a nonadjustable unique metering design, so that the shock absorber's custom reaction force profile can be maintained while maximizing the span of weights capable of being decelerated. The unique nonadjustable metering design enables a shock absorber to provide a built-in dual function of, one, looking and sounding better to a user, and two, decelerating the widest range of weights possible.

The dual function metering can be accomplished with tapered pin metering (either stepped or continuous taper), slotted pin metering (either stepped slotted, continuous single slotted, or continuous multislotted), flatted pin metering (either stepped or continuous taper), and fixed orifice metering. The goal is to generate a reaction force profile that is not linear, but rather aesthetically acceptable, while retaining the ability to operate over the largest range of weights as possible. This is accomplished by first dividing the shock absorber's stroke into five control zones of specific proportion, and secondly, optimizing the metering pathway area to match the desired weight range. The metering will create a custom force profile that always generates its maximum reaction force between 45–85% of the full stroke of a shock absorber when it is operated within its custom weight range. Furthermore, the shock absorber will continue to function effectively outside its custom weight range if the custom force profile is not required.

BRIEF DESCRIPTION OF THE DRAWINGS

FIG. 6 contains a Graph 1 which is a composite of a fragmentary cross section view of the fixed orifice embodiment of FIG. 4 and five control zones employed in the invention.

FIG. 8 is a Table I which shows that zone spacing is consistent regardless of shock absorber piston bore diameter or stroke length.

FIG. 9 is a Table II which shows that the weight span ratio is similar to a slotted pin metering area ratio.

FIG. 10 is a Table III which shows that the weight span ratio is similar to a fixed orifice metering area ratio.

DESCRIPTION OF THE PREFERRED EMBODIMENTS

Figure 1:
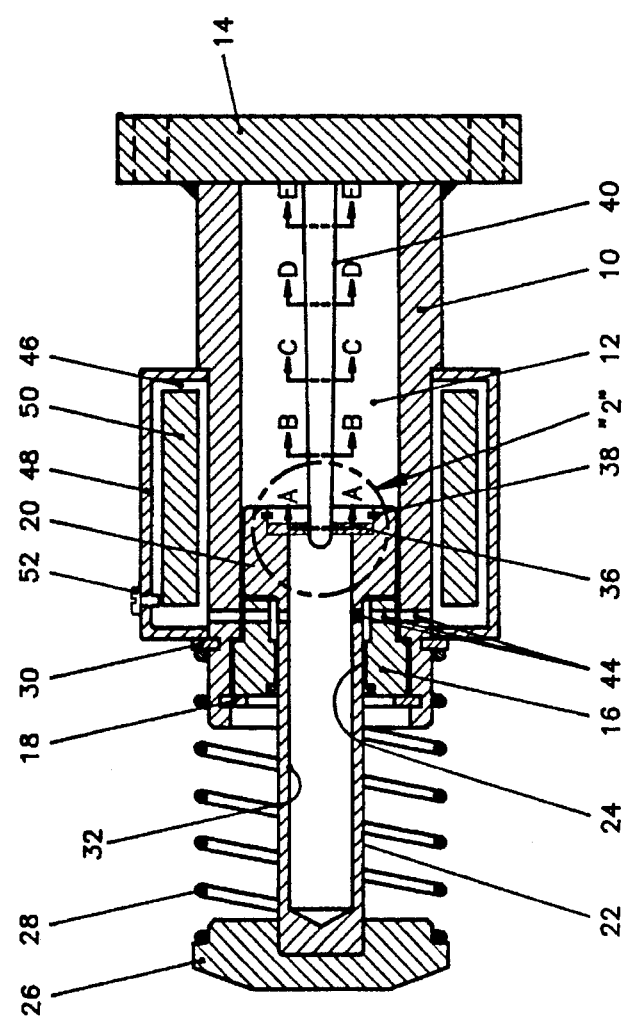
FIG. 1 is a longitudinal section view of a shock absorber made in accordance with the invention, and illustrating an embodiment employing a tapered pin dimensioned and contoured as described hereinafter according to the invention.

The shock absorber illustrated in FIG. 1 comprises a cylindrical body 10 having an internal high pressure zone chamber 12. The cylindrical body 10 is enclosed at the rear end by a conventional mounting pad 14. The front end of the high pressure zone chamber 12 is enclosed by a gland or piston cylinder head 16. The piston cylinder head 16 is retained in place by a suitable retainer ring 18. A piston 20 is slidably mounted in the high pressure zone chamber 12, and it is integrally connected to the inner end of a piston rod 22 that is slidably mounted through an axial bore 24 formed through the gland 16. A piston rod button 26 is operatively mounted on the outer end of the piston rod 22.

A return spring 28 is mounted around the outer end of the piston rod 22, with the outer end thereof abutting the inner face of the piston rod button 26. The inner end of the return spring 28 is seated around the reduced front end of the cylinder body 10 and against a suitable retainer ring 30 mounted around said reduced front end of the cylindrical body 10.

Figure 2:
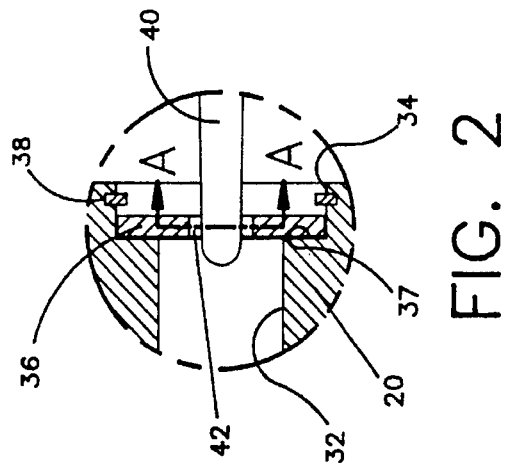
FIG. 2 is a fragmentary, enlarged view of the shock absorber structure illustrated in FIG. 1, taken within the circle marked by the numeral "2" in FIG. 1.
Figure 3:
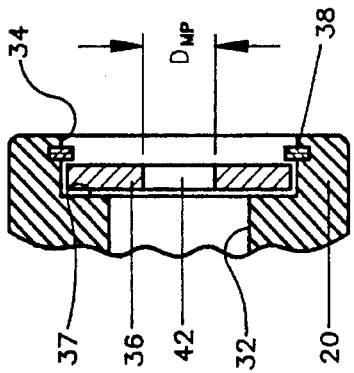
FIG. 3 is a fragmentary, section view, similar to FIG. 2 and showing the same structure with the tapered pin removed.

The piston rod 22 is provided with a cylindrical internal chamber 32 which is closed at its outer end and open at its inner end so as to communicate with the high pressure zone chamber 12 in the cylindrical body 10. As best seen in FIGS. 2 and 3, the inner end of the piston rod cylindrical chamber 32 is enlarged, as shown by the numeral 34. As shown in FIG. 2, a combination metering plate and check valve 36 is movably mounted in the enlarged end 34 of the piston rod cylindrical chamber 32 and it is retained therein by a suitable retainer ring 38.

As shown in FIG. 1, a metering pin 40 is axially mounted in the high pressure zone chamber 12 with its rear end fixed to the inner face of the mounting pad 14. The outer end of the metering pin 40 extends through a circular fluid metering pathway 42 formed axially through the metering plate and check valve 36 (FIG. 2). The metering pin 40 tapers from the inner end thereof lengthwise to the rear end, and the diameter thereof increases progressively toward the rear end thereof.

The numeral 44 designates a low pressure zone or pathway that is formed by a plurality of passages, formed through the piston rod wall, the piston cylinder head 16 and the cylinder body 10, and which communicates with a low pressure chamber 46 in an accumulator body 48. The accumulator body 48 is operatively attached to the outer periphery of the cylindrical body 10, in a conventional manner, and it is provided with a conventional elastomeric accumulator pad 50.

In use, the shock absorber shown in FIG. 1 has the mounting pad 14 typically mounted to a fixed structure. An object weight will impact the shock absorber on the piston rod button 26, and the piston 20 starts moving into the high pressure chamber 12. The metering plate and check valve 36 moves forwardly and seats against the shoulder 37 formed by the junction of the piston rod chamber 32 and the enlarged end 34 thereof, in the piston 20, as shown in FIG. 2. After the metering plate and check valve 36 is seated, the piston 20 continues to move further into the high pressure zone chamber 12 and the fluid in this chamber will start to increase in pressure. The only escape path for the increased pressure is out the metering pathway 42, in the metering plate and check valve 36, and past the metering pin 40. As the piston 20 and piston rod 22 continue to move into the high pressure zone chamber 12, the metering pin 40, which protrudes into the metering plate and check valve 36, forms an annulus type of metering which is the fluid metering pathway 42. As the piston 20 and piston rod 22 further continue to move into the high pressure zone chamber 12, the metering pathway 42 further restricts the high pressure fluid escaping from the high pressure zone 12 into the low pressure zone 44. The described restriction creates the metering necessary to provide a force profile as the piston 20 proceeds down the bore of the high pressure zone chamber 12 and through the stroke of the piston 20 and piston rod 22.

The high pressure or restricted fluid creates a reaction force that decelerates the moving weight. The fluid goes through the metering path 42, it then goes into the low pressure zone or pathway 44 and then into the low pressure chamber 46 in the accumulator body 48 in which it is stored in an elastomeric accumulator pad 50. The accumulator pad 50 is compressed as the piston 20 continues to move into the shock absorber. As the piston 20 continues to move down into the bore of the high pressure chamber 12 it closes off or reduces the area of the metering pathway 42 so that the metering pathway 42 will continue to maintain the proper fluid pressure inside of the high pressure chamber 12 to maintain the proper force profile. When the mass or object weight is stopped and released, the return spring 28 will push the piston rod 22, the piston rod button 26 and piston 20 back to the extended initial position, shown in FIG. 1. As the piston 20 and piston rod 22 move to the extended initial position, the metering plate and check valve 36 unseats itself and moves to the position shown in FIG. 3, so as to allow the hydraulic oil to move from the low pressure zone or pathway 44 back into the high pressure chamber 12. When the piston rod 22 fully returns to the initial extended position, it is ready to be again impacted. The numeral 52, in FIG. 1, represents a hydraulic oil or fluid screw plug in a fluid fill hole. The screw plug 52 may also serve as a bleed screw for bleeding air bubbles from the accumulator body 48.

Figure 4:
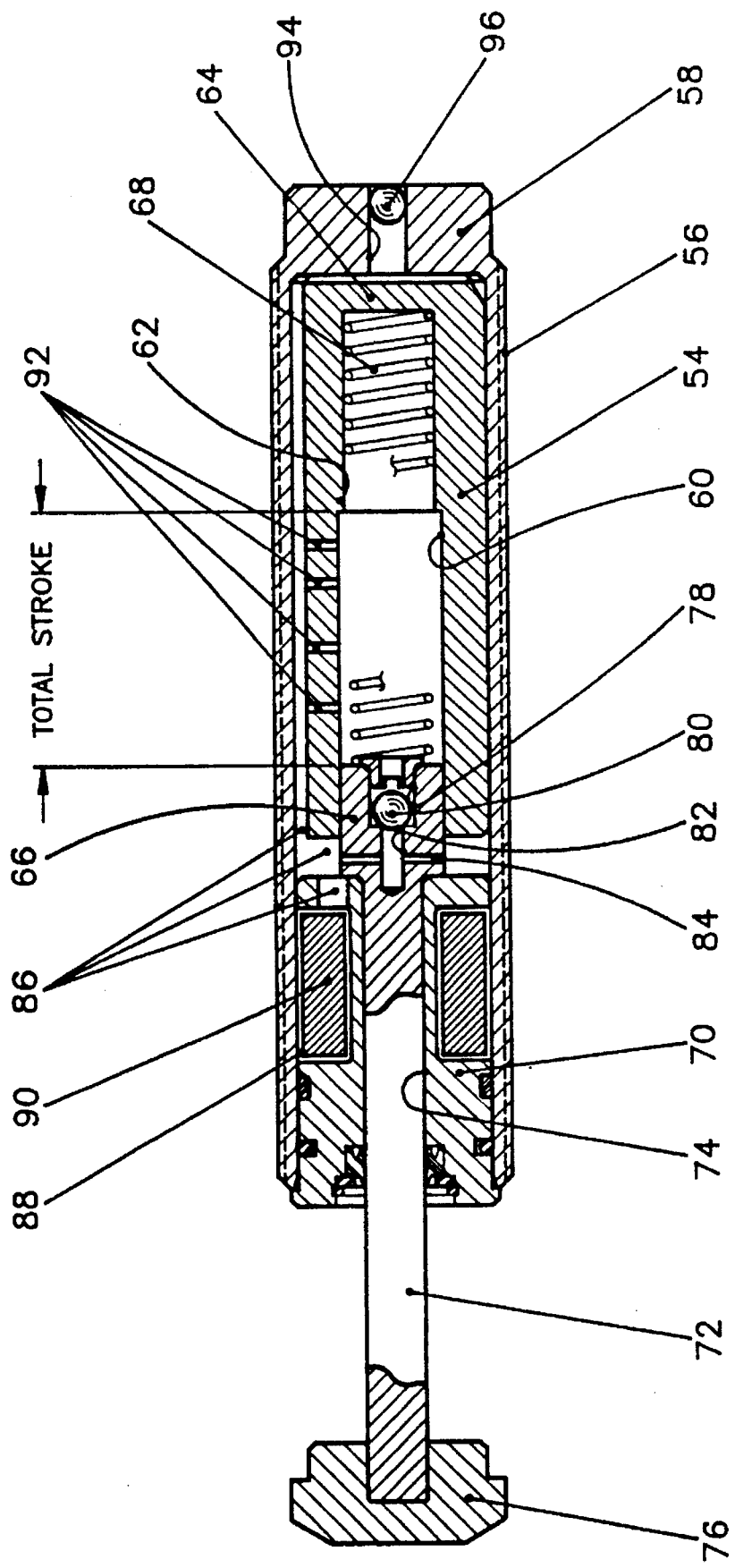
FIG. 4 is a longitudinal, section view of an alternate shock absorber embodiment made in accordance with the invention, and illustrating a pattern of fixed orifices to be dimensioned and spaced as described hereinafter according to the invention.

The shock absorber illustrated in FIG. 4, comprises a cylindrical outer tube or body 56 which has the rear end thereof enclosed by an integral rear end wall 58. Operatively mounted within the outer cylindrical tube or body 56 is an inner cylindrical tube 54 in which is formed a high pressure zone chamber 60. A reduced diameter chamber 62 communicates with the rear end of the high pressure zone chamber 60, and it is enclosed at its rear end thereof by an integral rear wall 64. The front end of the high pressure zone chamber 60 is open and a piston 66 is slidably mounted therein. A return spring 68 is mounted in the chambers 60 and 62, with the rear end thereof positioned in the reduced diameter chamber 62 and the front end thereof seated against the inner end of the piston 66 in the chamber 60. The front end of the cylindrical outer body 56 is enclosed by a gland or piston cylinder head 70. A piston 66 is integrally connected to the inner end of a piston rod 72 which is slidably mounted through an axial bore 74 formed through the gland or piston cylinder head 70. A piston rod button 76 is operatively mounted on the outer end of the piston rod 72.

As shown in FIG. 4, a ball check valve chamber 78 is formed in the inner end of the piston 66 and it communicates with an axial passage 82 formed through the rear end of the piston 66 and extended into the piston rod 72. A ball check valve 80 is operatively mounted in the valve chamber 78 and it is adapted to close off a flow of fluid through the passage 82 when the ball check valve 80 is seated against the inner end of the passage 82. Fluid is permitted to return through the valve chamber 78 and into the high pressure zone chamber 60 when the ball check valve 80 moves away from a blocking position against the inner end of the passage 82. The axial fluid passageway 82 communicates with a transverse fluid passageway 84 formed at the conjunction point between the rear end of the piston 66 and the integral piston rod 72. The transverse fluid passage 84 communicates at its outer ends with a plurality of low pressure fluid passages which are compositely designated by the numeral 86 and form a low pressure fluid pathway. The low pressure fluid pathway 86 communicates with a low pressure chamber 88 formed in the inner end of the piston cylinder head 70 and in which is mounted an elastomeric accumulator pad 90. The numeral 92 designates a plurality of fixed metering orifices formed through the wall of the inner cylindrical tube 54 and which communicate at their inner ends with the high pressure zone chamber 60 and at their outer ends with the low pressure zone or fluid pathway 86.

The numeral 94 designates a passage in the closed rear end 58 of the outer cylindrical tube 56. A ball check valve 96 is operatively mounted in the outer end of the passage 94. Hydraulic fluid may be admitted into the fluid system of the shock absorber through the passage 94. The passage 94 and ball check valve 96 also function as a means for bleeding air bubbles from the accumulator chamber 88.

Figure 7A:
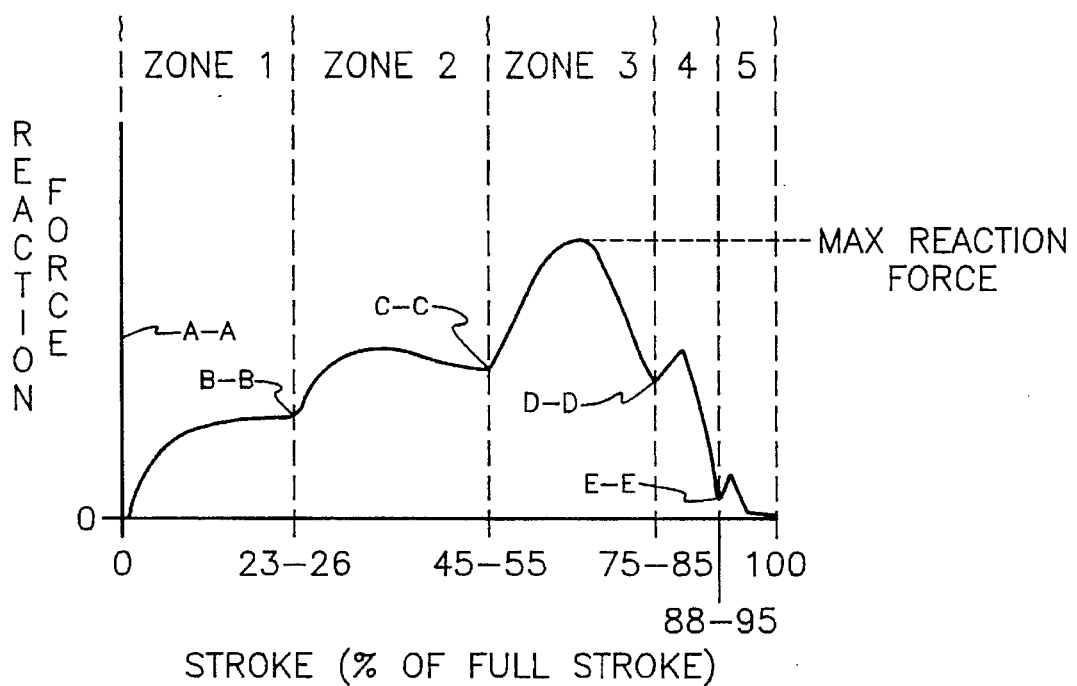
FIG. 7A is a Graph 2 showing a reaction force-stroke profile for slotted pin metering.
Figure 7B:
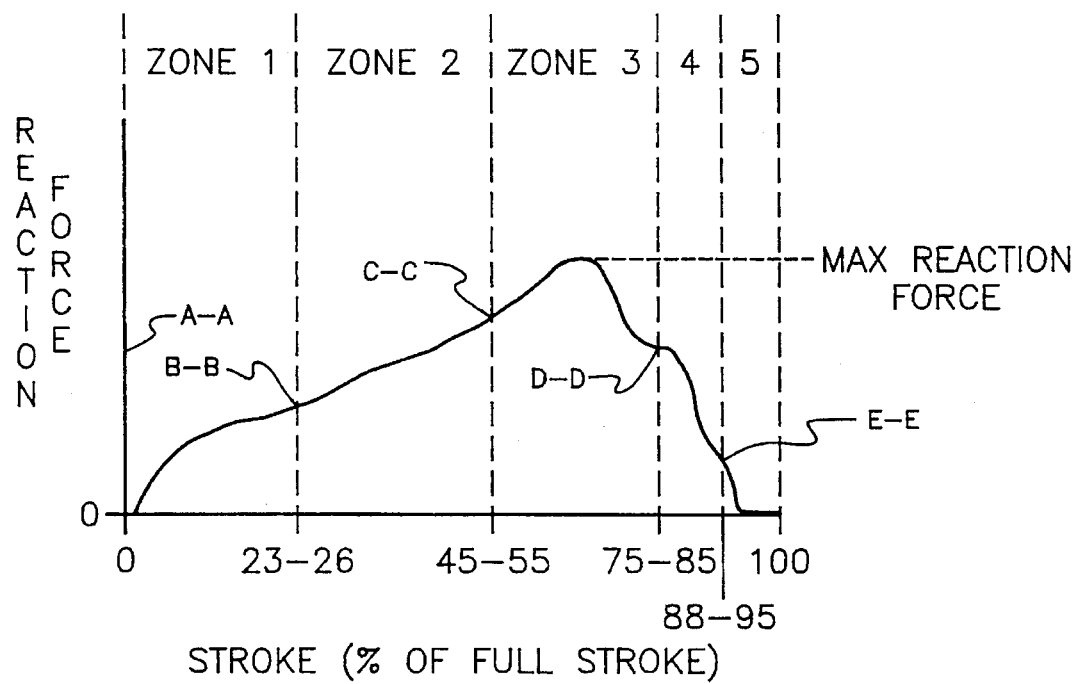
FIG. 7B contains a Graph 3 showing a reaction force-stroke profile for fixed orifice metering when the object weight span comprises a ratio of 3 to 1.

FIG. 4 illustrates a fixed orifice metering embodiment of the invention. In use, when a moving object impacts the piston rod button 76, it pushes the piston rod 72 and the piston 66 into the high pressure zone chamber 60 in the shock absorber. The ball check valve 80 seats against the front end of the passage 82 in the piston rod 72 to block flow through the passage 82, and this action forces all high pressure fluid to flow through the metering pathway 92 which comprises four orifices. As the piston rod 72 and weight thereon continues to push the piston 66 into the high pressure zone chamber 60, the high pressure fluid escapes through the metering orifices of the fluid metering pathway 92. The last described metering action generates the force profile which is shown in Graph 3 of FIG. 7B. Each time the piston 66 passes an orifice of the fluid metering pathway 92, such action is denoted on Graph 3 of FIG. 7 by the transition points, B—B, C—C, D—D and E—E, between the control zones 1 and 2, 2 and 3, 3 and 4, and 4 and 5, respectively. The diameters of each of the orifices of the fluid metering pathway 92 are selected in a proper ratio to match the minimum and maximum object weight to be decelerated. The diameters of said orifices are selected so that they will provide the right reaction force based on the impact velocity and weight to be decelerated. When the object to be decelerated comes to a stop and is released, the internal spring 68 pushes the piston 66, and piston rod 72 back to the initial extended position shown in FIG. 4. As the piston rod 72 and piston 66 begin moving back to the extended initial position the ball check valve 80 is unseated and allows the hydraulic oil to flow back into the high pressure zone chamber 60. During the piston 66 and piston rod 72 deceleration compression cycle, the hydraulic oil that escapes through the metering path 92 flows around through the oil return path 86 and into the low pressure chamber 88 to compress the elastomeric pad 90, which acts as an accumulator for the rod volume of the piston rod 72 as it continues to move into the shock absorber high pressure zone chamber 60.

Other than fluid metering pathway 92 of the embodiment of FIG. 1, and the orifice structure of the embodiment of FIG. 4, the structure of the shock absorbers shown in FIGS. 1 and 4 may be conventional.

Heretofore, most shock absorbers have strived to provide linear deceleration by providing a constant reaction force to the stroke of the shock. While such action minimizes the reaction force felt by a shock absorber, it does not provide the most aesthetically pleasing performance. The most aesthetically pleasing performance occurs when a shock absorber sounds the best and looks the best, and has a reaction force that starts low at the beginning, rises to a peak about in the middle of its stroke, and then decreases down to the end of the stroke, as illustrated in Graphs 2 and 4 of FIGS. 7A and 7C, respectively. Such a reaction force may be termed triangular shaped deceleration, as opposed to square wave deceleration. The triangular shaped deceleration may also be termed soft contact deceleration. With a soft contact deceleration, that is, a triangular shaped deceleration, a shock absorber will look and sound better, but the reaction force will be higher than a pure linear decelerator. Shock absorber users prefer to have a shock absorber that looks and sounds better. Therefore, it is desirable to design a series of shock absorbers whose performance is predominantly triangular shaped deceleration through the effective weight range, that is, the design range for which the shock is to be used. Even though fixed orifice shock absorbers have been around for many years, determining the orificing location, profile and metering method, has been difficult and elusive.

The present invention provides a simplified version to optimize a triangular shaped deceleration performance, while still maximizing the range of weights that a shock absorber can safely decelerate. This is accomplished by first dividing the total stroke into five control zones, as illustrated in FIG. 6, and in Graphs 2 and 3 of FIGS. 7A and 7B, respectively.

Zone 1 is the collision zone and comprises approximately the first 25% of the stroke of a shock absorber.

Zone 2 is the up load zone and comprises approximately the second 25% of the stroke of a shock absorber.

Zone 3 is the maximum force zone and comprises approximately an additional 25% of the stroke of a shock absorber.

Zone 4 is the down load zone and comprises approximately an additional 15% of the stroke of a shock absorber.

Zone 5 is the set down zone and comprises the approximate last 10% of the stroke of a shock absorber.

The division of the total stroke of a shock absorber into five control zones now enables a shock absorber designer to determine the proper metering area at the transition points, B—B, C—C, D—D and E—E, between zone 1 and 2, zone 2 and 3, zone 3 and 4, and zone 4 and 5, respectively. As shown in Table I of FIG. 8, the spacing between the transition points is very consistent and shows three different shock absorber examples, units 1, 2, and 3, having three different bore diameters, and three different shock absorber stroke lengths, and wherein the length of each of the five control zones is very close in percentage of the stroke of each of the three shock absorbers. The right end column of Table I sets forth an optimum design range for each of the four transition points, expressed in percentages of the length of the shock absorber stroke. The last mentioned specified range of zone lengths are shown on Graph 1 of FIG. 6, Graphs 2 and 3 of 7A and 7B, respectively, and Graphs 4 and 5 of FIGS. 7C and 7D, respectively.

In the past most shock absorber designers have spaced orifices exponentially. It will be seen that the spacing of the five control zones is rather linear. Such orifice spacing simplifies design procedure since there are only four transition points.

Figure 5A:
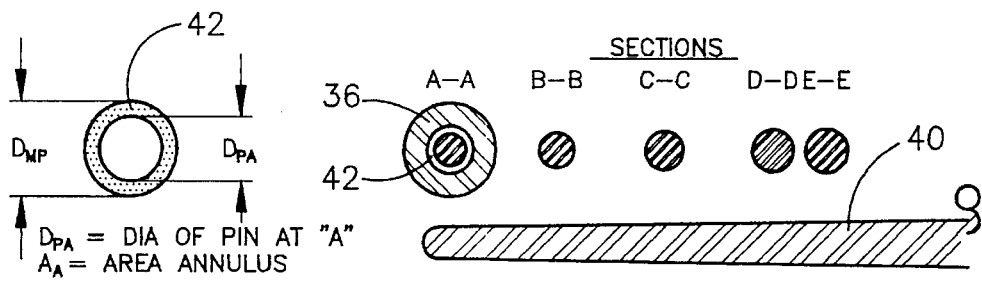
FIGS. 5A, 5B, 5C, 5D and 5E are Charts showing the metering areas for shock absorbers made in accordance with the present invention, and showing the metering areas for shock absorbers employing a tapered pin, a flatted pin, a single slot pin, a multislot pin and fixed orifices.
Figure 5B:
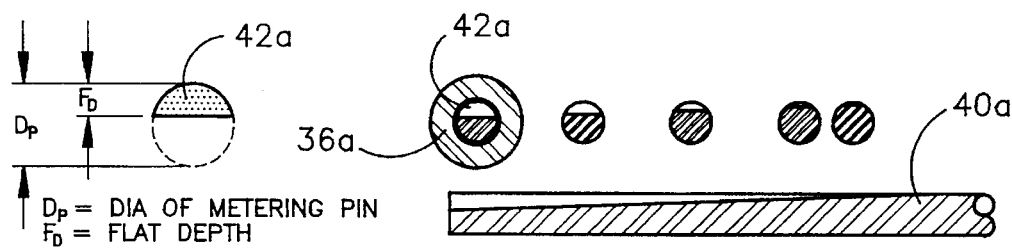
Figure 5C:
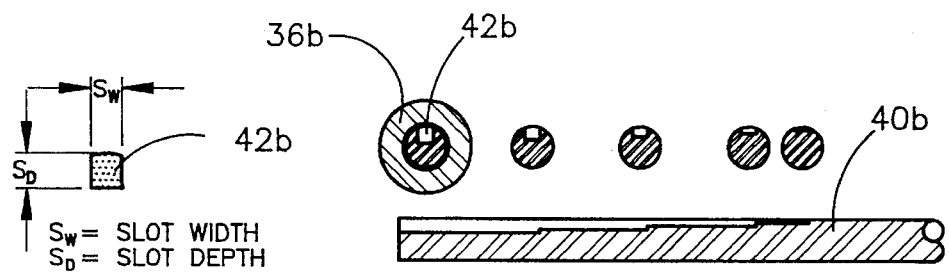
Figure 5D:
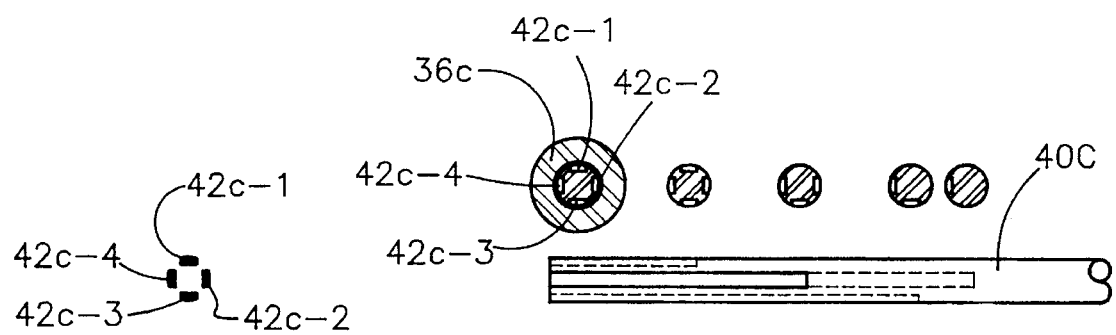
Figure 5E:
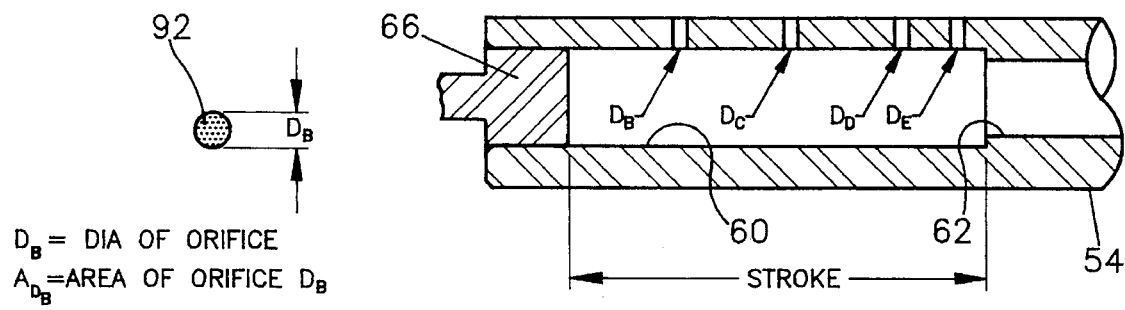

FIGS. 5A, 5B, 5C, 5D and 5E show five different metering methods for determining the metering area at each of the transition control zones to accomplish the goal of providing triangularly shaped force levels during the compression of the shock absorber. In FIG. 5A the first example is a tapered pin 40. The tapered pin 40 provides an annulus metering area 42. The tapered pin 40 may comprise a "continuous" taper or a "progressively stepped diameter" taper. As shown in FIG. 2, the tapered pin 40 is inserted through a metering and check valve plate 36, and therefore the diametrical clearance between the tapered pin 40 and the metering and check valve plate 36 determines the annulus leakage area which is the metering pathway. The second type of metering shown in FIG. 5B is a flatted pin 40a. The flatted pin 40a provides a semicircular metering area 42a which may also be stepped or continuously flatted from end to end of pin 40a. The third type of metering shown in FIG. 5C is a single stepped slotted pin 40b. The slotted pin 40b has a single groove longitudinally formed in the pin at prescribed depth steps. The slot depth along with the slot width determines the metering area passageway 42b. The three above listed pin metering methods may be employed with the shock absorber shown in FIG. 1. The fourth type of metering shown in FIG. 5E is labeled fixed orifice. Fixed orifice metering provides a series of orifices, each of fixed metering area 92, which are spaced apart longitudinally along the inner tube 54 of the type of shock absorber shown in FIG. 4. In FIG. 5D a fifth metering method is shown and comprises a multislot pin 40c that has four longitudinal slots which provide the metering area passageways for the four transition control zones. The slots are designated by the numerals 42c-1, 42c-2, 42c-3 and 42c-4.

In use, all of the metering devices shown in FIGS. 5A, 5B, 5C, 5D and 5E reduce the metering pathway area as a shock absorber piston and rod (20,22) (66,72) move into the high pressure chamber (12,60), thereby reducing the passage for the oil to escape out of the high pressure chamber (12,60). The oil escape rate controls the reaction force that the shock absorber generates during deceleration for triangular metering. The goal is to control the metering action such that the maximum reaction force always occurs in zone 3, that is 45–85% through the stroke of the shock absorber. Graphs 2 (FIG. 7A) and 3 (FIG. 7B) show force profiles of triangular shape type metering. Graph 2 (FIG. 7A) shows the force profile generated by the slotted pin metering, while Graph 3 (FIG. 7B) shows the force profile generated by the fixed orifice metering.

Orificing designed to cover the widest range of weights may be called self compensating. As shown in Graph 3 (FIG. 7B), the fixed orifice metering, provides a force profile that has a maximum reaction force in control zone 3, which is triangular shape metering. A self compensating force profile would allow the peak force to occur in any one of the zones. The shock absorber would still perform effectively, that is it would stop the mass, but it would not look and sound as good as the triangular shape metering. However, some customers are interested in having the widest operating range in a shock absorber, therefore it is desirable to design self compensating to handle the widest range of weights as possible but combine that with the most aesthetically pleasing performance as possible. Self compensating orificing can be designed to combine both the triangular shape metering with the ability to handle the widest range of weights possible. Soft contact and self compensating dual purpose metering is accomplished by setting up the five transition control zones and optimizing the metering in each one of the transition control zones.

Selecting the metering area at each one of the transition control zones will be obvious by reviewing Tables II and III. Table III shows that the weight span ratio, that is maximum to minimum, is very close to the metering area ratio. This is an important key to selecting the proper metering area for a shock absorber. Table III shows that shock absorber unit #2 had a minimum weight of 15 pounds and a maximum weight of 45 pounds, which is approximately a 3.0 to 1 ratio. Shock absorber unit #1 had a 5 pound minimum weight and a 15 pound maximum weight, which is a 3 to 1 ratio. Similarly, shock absorber unit #3 had a 45 to 135 pound weight span. Each one of the aforecited weight spans is a 3 to 1 weight ratio, and the corresponding metering area ratios are likewise a 3 to 1 ratio. The foregoing information shows control zone spacing for a shock absorber can be provided by using the range of stroke percentages found in Graphs 2 (FIG. A) and 3 (FIG. B), or in Table I. Then, by choosing the minimum and maximum weight, the ratio thereof provides the approximate ratio between the total orifice area for control zones 1 and 2, and the total orifice area for control zones 3 and 4. These ratios are also applicable for the other types of metering, that is, slotted pin, flatted pin, and tapered pin. As long as the ratio of the total metering area of the control zones 1 and 2, and the total metering area of the control zones 3 and 4 are similar to the ratio of the minimum and maximum design weight, a shock absorber will perform effectively through out the weight span.

When the foregoing procedure is used, it is possible to cover the widest range of self compensating weights, while still providing good triangular shape metering for the middle weights which we call soft contact. The orificing method of the invention combines soft contact and self compensating functions to provide two types of performance in one metering apparatus.

It will be understood, that soft contact and self compensating force profiles can be provided by using the spacing of the five zones, as shown in Graph 1 (FIG. 6), and listed in Table I.

Proper selection of the total metering area of control zones 1 and 2, and the total metering area of control zones 3 and 4 will allow soft contact performance to be optimized, and also the self compensating range to be maximized. Selecting the proper metering area means matching the ratio between the metering areas with the ratio between the minimum and maximum object weights. Creating metering areas whose ratio matches the object weight ratio can be accomplished in two ways. For example, when employing fixed orifice metering areas, the first two orifices and the last two orifices may be the same diameter, or all four orifice diameters may be different (See Table III of FIG. 10). In both of these cases, the ratio of the combined area of orifices 1 and 2, and the combined area of orifices 3 and 4 are maintained. As an example, in FIG. 10, Table III, and Graphs 4 (FIG. 7C) and 5 (FIG. 7D), it will be seen that the shock absorber unit #1 has a weight span of 5 to 15 pounds, which is a 3 to 1 ratio for this triangular type dampening. Unit #1 will also provide self compensating performance through a 6 to 1 weight ratio. This demonstrates that soft contact gives a 3 to 1 ratio, and in the same shock absorber unit, self compensating can give a 6 to 1 ratio. In Tables II and III, FIGS. 9 and 10, respectively, the terms "front" and "back" refer to the transition points B—B, C—C, and D—D, E—E, respectively.

Figure 7C:
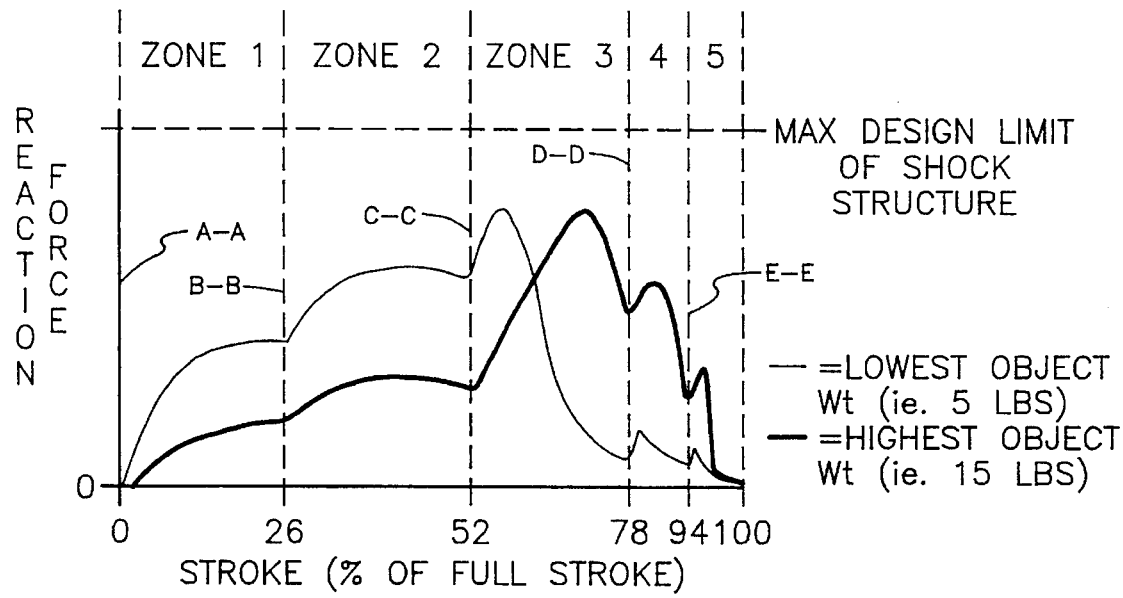
FIG. 7C is a Graph 4 showing a reaction force-stroke profile for soft contact deceleration when the object weight span comprises a ratio of 3 to 1.
Figure 7D:
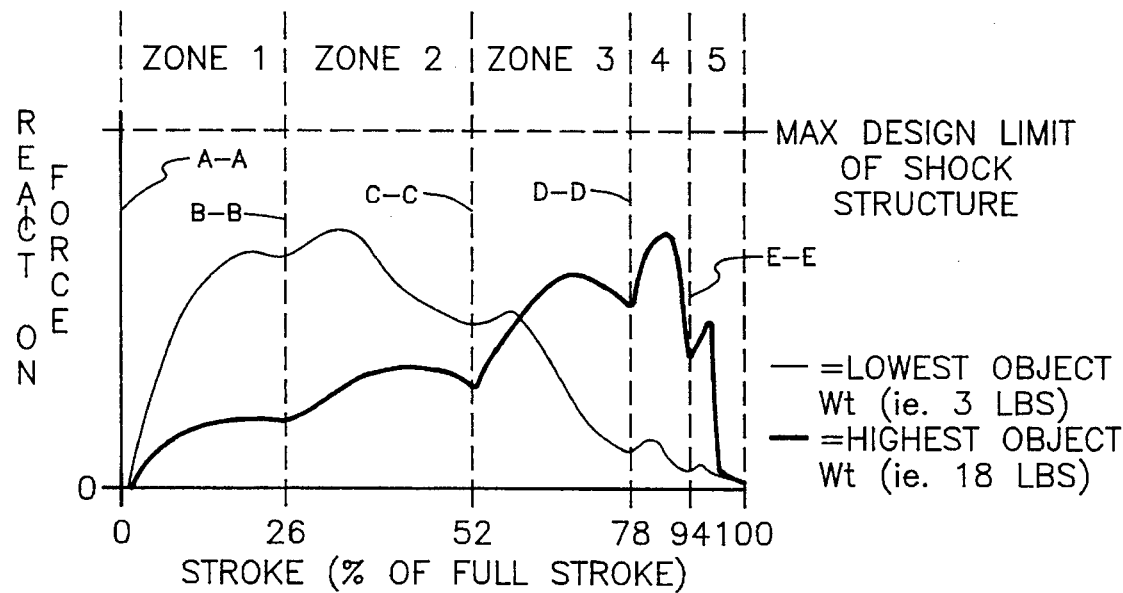
FIG. 7D contains a Graph 5 showing a reaction force-stroke profile for self compensating deceleration when the object weight span comprises a ratio of 6 to 1.

In FIG. 7C, Graph 4 shows that the soft contact, maximum reaction force is always in Zone 3 and below the shock absorber's structural design limit. When the weight range is expanded to a 6 to 1 ratio, as with self compensating, the maximum reaction force will move into Zone 2 or 4, and remain below the shock absorber's maximum structural design limit, as shown in FIG. 7D, Graph 5. If the weight span is further expanded, it will eventually cause the maximum reaction force to exceed the structural design limit, and move to any position throughout Zones 1 through 5. In summary, this invention specifies a design for metering that provides both optimized soft contact performance as well as a maximized self compensating performance without exceeding the shock's structural design limit.

Any suitable method may be employed to determine the total metering area. A formula for determining the total metering area can be derived from Bernoulli's fluid energy theorem:

$$F = wA(n^2 - 1)\frac{v^2}{2g}$$ Equation #1

$$F = \frac{Wv^2}{2sg} \quad \text{Equation \#2}$$

v = Impact velocity g = gravitational constant

Combining Equations 1 and 2, simplifying, and rearranging:

$$A = \frac{1}{CD12} \sqrt{\frac{A_p^3 ws}{W}}$$

This relationship for determining the total metering area uses only five parameters:

W—Weight of the load
Ap—Piston area
w—Density of the hydraulic fluid
s—Stopping distance of the load (Shock Stroke)
CD—Discharge coefficient (Typical is 0.6)
A—Metering Area

What is claimed is:

1. A nonadjustable shock absorber for soft contact deceleration of a shock load including, a low pressure zone (44), a hydraulic cylinder having a high pressure zone chamber (12,60), a piston (20,66) in said cylinder for movement under a shock load through a predetermined total stroke length from an initial position to a final position therein, and fluid pathway metering control means for controlling high pressure fluid escaping from the high pressure zone chamber (12,60) into the low pressure zone (44), ahead of the piston (20,66) as the piston moves from the initial position in response to a shock load, said fluid pathway metering control means serving to control the high pressure fluid escape rate as a function of piston displacement from the initial position, wherein the improvement comprises:

(a) said fluid pathway metering control means comprises four fluid metering pathways, of which the first three fluid metering pathways are approximately linear spaced apart, each having a predetermined area, which operate to successively restrict the amount of high pressure fluid escaping from the high pressure zone chamber, and the area of each of the four spaced apart fluid metering pathways being closed off at a first, a second, a third and a fourth transition point as the piston moves from the initial position through its predetermined total stroke to its final position to create a number one, two, three, four and five control zones and to provide a triangular shaped force profile during the compression of the shock absorber;

(b) said number one control zone, extending from the initial position of said piston to said first transition point, and having a length of from 23 percent to 26 percent of the the total length of the piston stroke;

(c) said number two control zone, extending from the first transition point to the second transition point, and having a length of from 23 to 26 percent of the total length of the piston stroke;

(d) said number three control zone, extending from the second transition point to the third transition point, and having a length of from 24 to 28 percent of the total length of the piston stroke;

(e) said number four control zone, extending from the third transition point to the fourth transition point, and having a length of from 13 to 18 percent of the total length of the piston stroke; and, (f) said number five control zone, extending from the fourth transition point to the total stroke position of the piston, and having a length of from 2 to 10 percent of the total length of the piston stroke.

2. A shock absorber as defined in claim 1, wherein:

(a) the shock load ranges in a predetermined design ratio from a minimum weight to a maximum weight; and, (b) the ratio, of the combined metering areas of the first and second metering pathways, to the combined metering areas of the third and fourth metering pathways matches the design ratio of the minimum weight to the maximum weight to provide self compensating dampening.

3. A shock absorber as defined in claim 2, wherein:

(a) said first, second, third and fourth metering pathways each comprises a cylindrical fixed orifice.

4. A shock absorber as defined in claim 3, wherein:

(a) each of the first and second cylindrical fixed orifices have the same metering area; and, (b) each of the third and fourth cylindrical fixed orifices have the same metering area which is smaller than the metering area of each of the first and second cylindrical fixed orifices.

5. A shock absorber as defined in claim 3, wherein:

(a) the first and second cylindrical fixed orifices have different metering areas which are different from each other, and the third and fourth cylindrical fixed orifices have different metering areas which are different from each other, and which are different from the metering areas of the first and second cylindrical fixed orifices.

* * * * *

UNITED STATES PATENT AND TRADEMARK OFFICE
CERTIFICATE OF CORRECTION

PATENT NO. : 5,566,794
DATED : October 22, 1996
INVENTOR(S) : Harold D. Wiard

It is certified that error appears in the above-indentified patent and that said Letters Patent is hereby corrected as shown below:

Column 7, line 64, after "FIG." insert --7--.
Column 7, line 65, after "FIG." insert --7--.

Signed and Sealed this

Twenty-fourth Day of December, 1996

Attest:

BRUCE LEHMAN

*Attesting Officer*  *Commissioner of Patents and Trademarks*